(12) United States Patent
Nübling et al.

(10) Patent No.: US 7,932,485 B2
(45) Date of Patent: Apr. 26, 2011

(54) METHOD AND APPARATUS FOR THE DYNAMIC GENERATION AND TRANSMISSION OF GEOMETRICAL DATA

(75) Inventors: Achim Nübling, Emmendingen (DE); Thomas Schopp, Freiburg (DE)

(73) Assignee: Sick AG, Waldkirch (DE)

( * ) Notice: Subject to any disclaimer, the term of this patent is extended or adjusted under 35 U.S.C. 154(b) by 133 days.

(21) Appl. No.: 12/219,333

(22) Filed: Jul. 21, 2008

(65) Prior Publication Data
US 2009/0048705 A1    Feb. 19, 2009

(30) Foreign Application Priority Data

Aug. 14, 2007   (EP) ..................................... 07015924

(51) Int. Cl.
*G01M 9/04*  (2006.01)
*G06M 7/00*  (2006.01)
*H01J 40/14*  (2006.01)

(52) U.S. Cl. .......... 250/223 R; 250/559.04; 250/559.19; 250/559.26

(58) Field of Classification Search .............. 250/223 R, 250/223 B, 573, 559.01, 559.04, 559.06, 250/559.12, 559.13, 559.19, 559.21, 559.26
See application file for complete search history.

(56) References Cited

U.S. PATENT DOCUMENTS 4,490,848 A * 12/1984 Beall et al. ..................... 382/152
2007/0131877 A9 * 6/2007 Hiroi et al. ................. 250/492.2

FOREIGN PATENT DOCUMENTS

EP         0 851 209 A1   7/1998
WO         00/42381 A     7/2000

* cited by examiner

*Primary Examiner* — Thanh X Luu
*Assistant Examiner* — Francis M Legasse, Jr.
(74) *Attorney, Agent, or Firm* — The Nath Law Group; Jerald L. Meyer; Jiaxiao Zhang

(57) ABSTRACT

An object geometry measurement apparatus (10, 20) for the dynamic generation and transmission of geometrical data of objects (14) moved on a conveying device (12) is set forth, wherein the apparatus has a first optoelectronic sensor (10) which is made for the detection of the object geometry in a section of the object (14) with reference to intervals and/or of the remission behavior, as well as a first control (20) which can calculate geometrical data from the object geometry of each section and can output them via a first interface. In this respect, the first control (20) is made to adapt the information density of the output geometrical data to a measure for changes of the object geometry from section to section.

17 Claims, 2 Drawing Sheets

Figure 1:
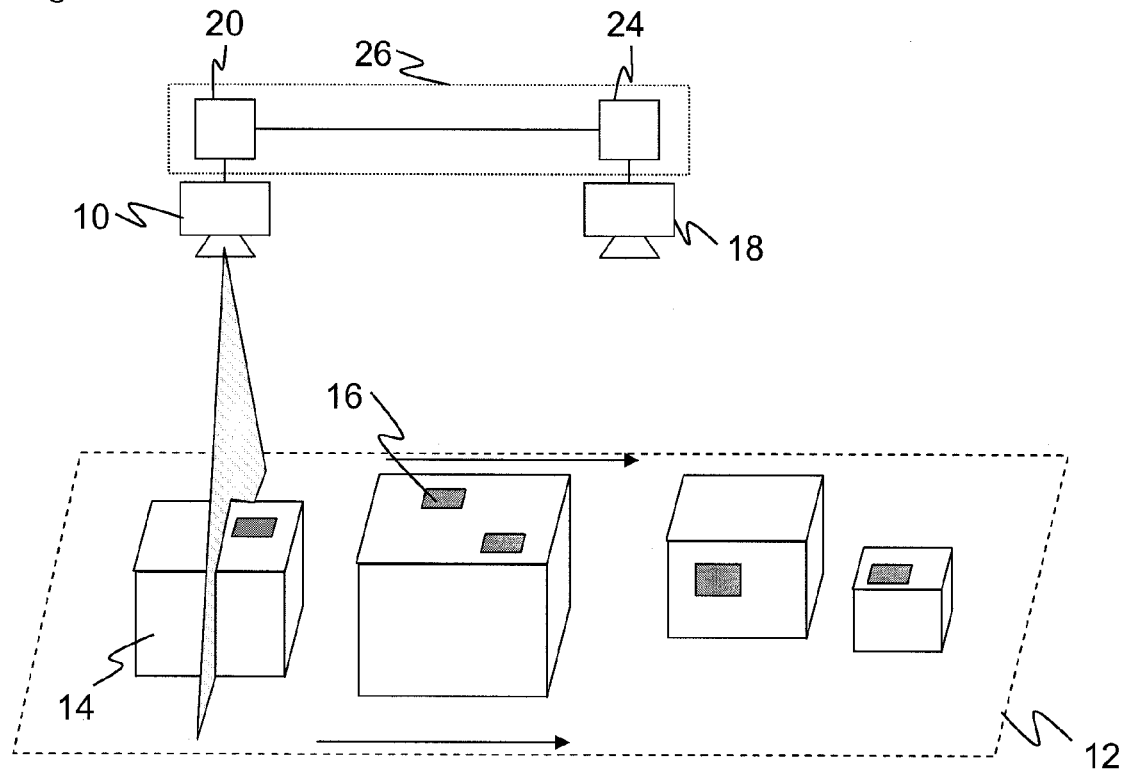

METHOD AND APPARATUS FOR THE DYNAMIC GENERATION AND TRANSMISSION OF GEOMETRICAL DATA

The invention relates to an object geometry measurement apparatus and to a method for the dynamic generation and transmission of geometrical data in accordance with the preambles of claim 1 and claim 11 respectively.

In systems for object recognition and object measurement, information has to be determined on the shape, the dimensions and/or structures of an object. For this purpose, optoelectronic sensors can be used, for example laser scanners, camera systems or also integrated systems which include both an image sensor and a distance measurement based on time of flight. An example for such integrated systems is a sensor which simultaneously has a scanning beam and an imaging chip or which can determine both the remission behavior and the time of flight of the transmitted scanning ray without an additional imaging chip. Another example is that of CMOS chips which are based on photon mix detection (PMD) and whose pixels can record both brightness data and also distance data determined using a time of flight method.

The dimensional information and positional information detected in this manner can be used to grip objects, for instance by a robot, to align other systems to the orientation of the object or to identify important portions of the object in advance for a later more precise evaluation.

In an important class of object geometry measurements, the system is mounted to a conveyor belt on which the objects move past while their external contour is scanned line-wise. While the scanning is still taking place, that is before the object has been moved past the system, geometrical data are dynamically transmitted to subsequent units in real time. A robot can thus, for example, already plan its gripping movement while further parts of the object geometry are still being determined. In this respect, a large amount of data has to be transmitted to the measurement system to describe the object geometry.

In conventional systems, the corners of the object and its height are determined. The location and orientation of the object is defined via them. The amount of data can thus be limited because a low number of pieces of information is sufficient to describe the geometry under the assumption of a parallelepiped-shaped object. With non-parallelepiped-shaped objects, an enveloping parallelepiped is defined and this is used for the determination of the geometrical data. Intermediate information is generated within the object with respect to each scanned line at regular intervals. This intermediate information typically consists of a left hand boundary and a right hand boundary of the object in the line direction. It is disadvantageous in this prior art that the regular interval has to be selected large enough so that the amounts of data arising do not exceed the transmission capacity of the data path to a connected subsequent system or the processing capacity of the connected system. The time interval and geometrical spacing between the transmission of two pieces of intermediate information and thus the resolution of the geometrical data are thus restricted in their precision. The information on the spatial location and orientation is thus only imprecise or incomplete specifically for non-parallelepiped-shaped objects. Whereas parallelepiped objects can also be extrapolated well with respect to their location and orientation with a low number of pieces of intermediate information even before the final information is present, the named conventional method is not suitable for objects of any desired shape.

An arrangement of a geometry measurement system and of a subsequent line scan camera is known from DE 10 2004 049 482 A1 in which the geometry measurement system recognizes regions of interest, in particular regions of interest with code information, of objects moved on a conveyor belt. The line scan camera can then take or evaluate only the regions of interest directly. As in the conventional systems described in the last paragraph, however, the geometrical data are transmitted at regular intervals so that the disadvantages with objects of irregular shape are not herewith overcome.

It is therefore the object of the invention to set forth a geometry measurement system which can take geometrical data dynamically and can transmit high-resolution geometrical information with a limited amount of data.

This object is satisfied by an object geometry measurement apparatus in accordance with claim 1 and by a method in accordance with claim 11. The geometry is first detected with high resolution by the solution in accordance with the invention so that all the relevant geometrical information of objects of irregular shape is also known. To reduce the transmitted amount of data, however, geometrical information is only output when larger changes in the last measured sections of the object are recognized. As long as partial regions of the object are therefore regular, no geometrical information or only a little geometrical information is transmitted because a subsequent system for which the geometrical data are provided can detect the structure of the object sufficiently precisely by extrapolation. If, in contrast, a partial region has an irregular shape, geometrical information is transmitted at a higher information density so that subsequent systems can take these changes into effect.

The advantage is associated with this of being able to transmit irregular object geometries without any larger practical losses in relevant resolution with a limited amount of data and thus also on lines or bus systems with a limited bandwidth or also to be able to further process these data with subsequent systems of limited data recording capacity and computing capacity.

In this respect, the invention starts from the principle of describing and transmitting more complicated object contours in a more complex manner than simpler geometries which can therefore be detected by extrapolation. Information on objects of any shape can thus be reduced without losing relevant information content on the object. The data of the geometrical data to be transmitted are designed such that the data transmission is utilized ideally.

The first sensor is preferably a line scan sensor and each section a line, and the output geometrical data are the positions of edges or corners of the objects or regions of interest, in particular code regions, within each line. In this respect, here and in the following, no difference is made between a two-dimensional geometry and a three-dimensional geometry, which are both covered by the invention. To this extent, the terms "surface", "edge" and "corner" in a two-dimensional geometry have to be understood analogously and not literally; for example, in some two-dimensional situations, an "edge" can thus correspond to a "surface". The line scan sensor transverse to the conveying direction then takes the object geometry line-wise during the moving past of the objects and transfers the relevant data on edges or corners with which the geometry of the object is substantially described in compact form.

The first control is advantageously designed to output one respective gradient vector with respect to each edge or corner for the adjacent surfaces and only to output further geometrical data with respect to a corner or edge when the gradient of a surface in a section changes with respect to the output gradient vector or to that of the previous section by more than a preset gradient threshold. The amount of data to be output can thus be further reduced because the object geometry of the next section moved past can be extrapolated from the position of the corner or edge and from the associated gradient vector and, as long as the gradient does not change greatly, this extrapolation also detects the object geometry very exactly. The required precision for the extrapolation and thus the resolution of the geometry data can be set via the gradient threshold.

The first control is preferably made to output geometrical data for each section if the changes are larger than a preset threshold and not to output any geometrical data or only to output geometrical data for every nth section if the changes are smaller than a preset threshold. If therefore the geometrical data changes a great deal from section to section, geometrical data are transmitted at the maximum precision limited by the bandwidth. Less pronounced changes in the object geometry can be transmitted at a lower resolution to relieve the transmission lines and the subsequent systems by stepped omission of geometrical data for sections in which the object has a regular shape measured at the threshold. An adaptation of the transmitted amount of data to the changes in the object geometry can thus be realized in a simple manner to achieve a high precision in the resolution despite the limited amount of data.

The geometrical data advantageously have a location, a volume, a contour and/or an orientation of the objects. They represent information on the object geometry which is particularly helpful for subsequent systems in the control of their tasks with the measured objects.

In a further development of the invention, the geometry measurement apparatus is part of a reading apparatus for codes which additionally has an integrated second optoelectronic sensor, or a second optoelectronic sensor arranged subsequently in the conveying direction, which is designed for the detection of codes, as well as a second interface for the reception of the geometrical data. The second optoelectronic sensor therefore knows the geometry of the objects for the code reading and can be set accordingly and concentrate on regions in which codes are actually present.

A second control of the second sensor is advantageously provided in the reading apparatus and is made to take or evaluate image data only within regions designated by the geometrical data or regions of interest or to take or evaluate them at higher precision and correspondingly not to take or evaluate image data outside regions designated by the geometrical data or regions of interest or to take or evaluate them with lower precision. The second sensor thus utilizes the geometrical data to be able to concentrate on the actual task of the code reading and to ignore irrelevant regions in the field of view right from the start or only to evaluate them roughly.

Furthermore, the second control can advantageously be made to determine object limits or limits of regions of interest with reference to transmitted positions of edges or corners of objects or regions of interest and to interpolate and/or extrapolate these limits, in particular in a linear manner, by means of a likewise transmitted gradient vector. The transmission of the geometrical data thus takes place in a particularly compact manner; and also at times in which geometrical data are transmitted in order to limit the amount of data, the second control can develop a very good model for those regions of the objects for which it does not receive any geometrical data with a minimum computing effort.

In all embodiments described, the first sensor is preferably a laser scanner or an image sensor and the second sensor is preferably a barcode scanner or likewise an image sensor. A laser scanner is suitable for the determination of distance data, but has moving mechanical parts. In contrast, an image sensor is less maintenance prone, but needs a higher effort for the image evaluation. The corresponding benefits of the possible embodiment of the first and second sensors can thus be selected in dependence on the application.

In another further development of the invention, the geometry measurement apparatus is connected to a subsequent processing device, in particular a robot, with the first sensor being integrated in the robot or with this robot being arranged after the first sensor in the conveying direction and with the processing device having a processing control for the reception of the geometrical data which is made for the processing of the geometrical data for the planning of gripping steps and machining steps. Similar to the code reader, a robot can also profit from the geometrical information obtained in real time and dependent on the regularity of the object contour whose amount of data is reduced both to relieve the data lines and for a simple further processing in accordance with the invention. This not only applies to a robot, but also to further conceivable subsequent systems which require the location, position, volume or similar properties of objects for their task.

The method in accordance with the invention can be further developed in a similar manner and shows similar advantages. Such advantageous features are described by way of example but not exclusively in the dependent claims following the independent claims.

Figure 2:
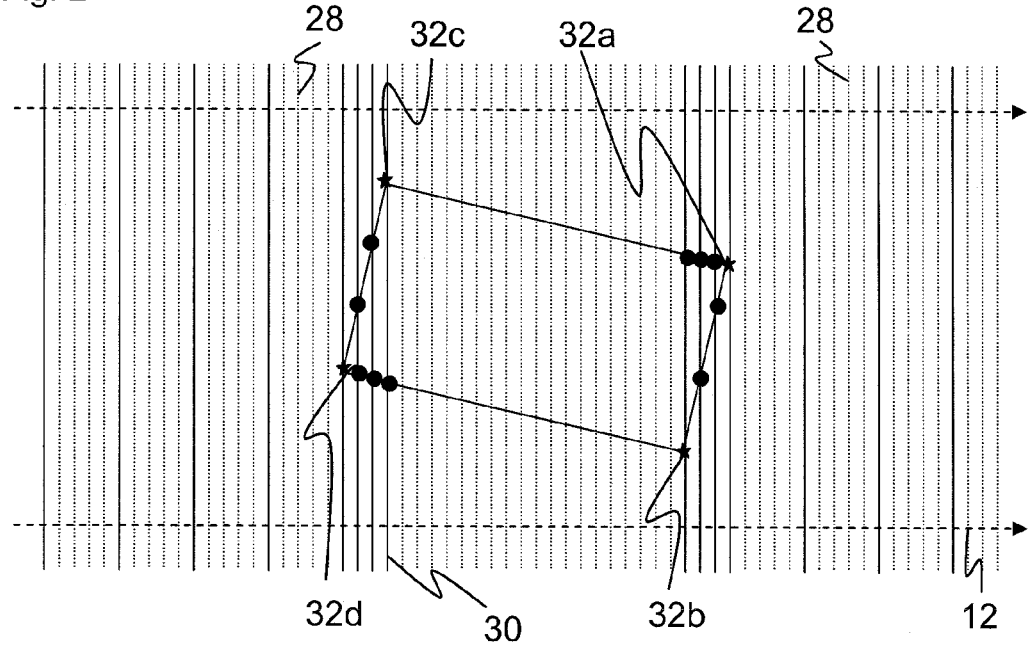
Figure 3:
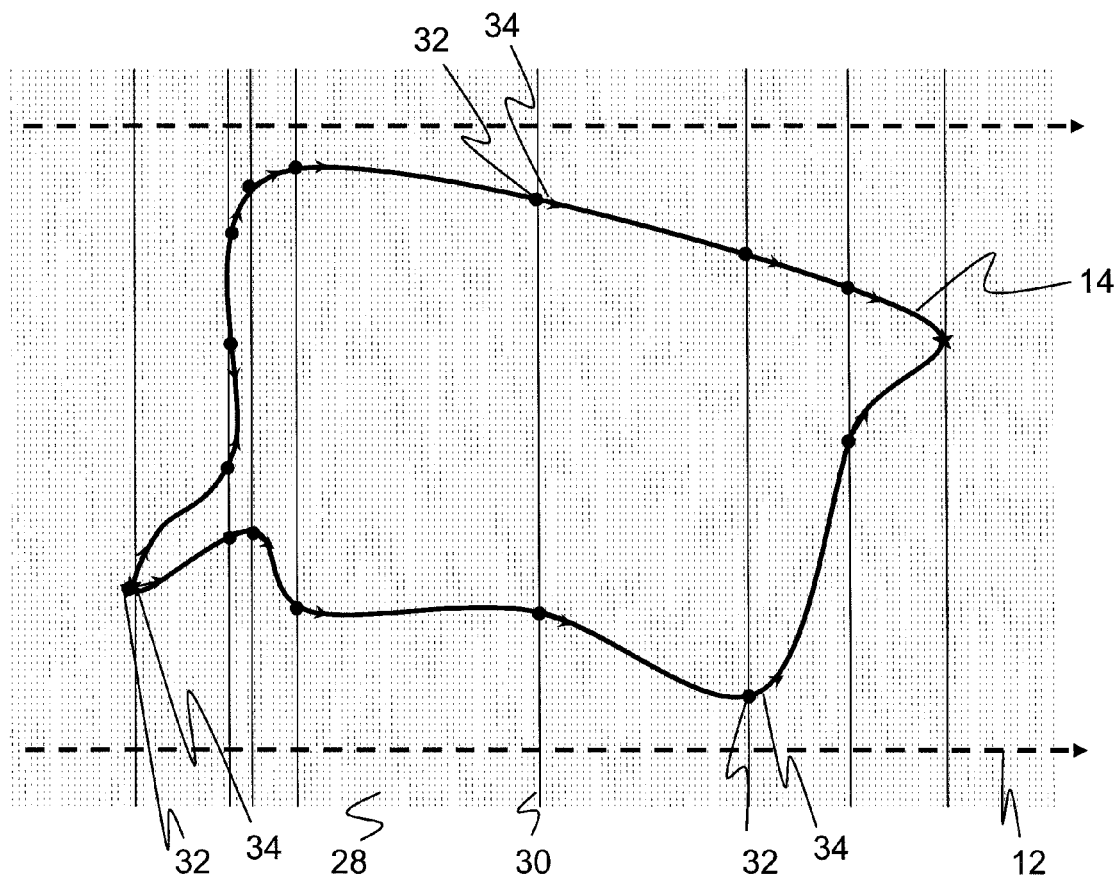
Figure 4:
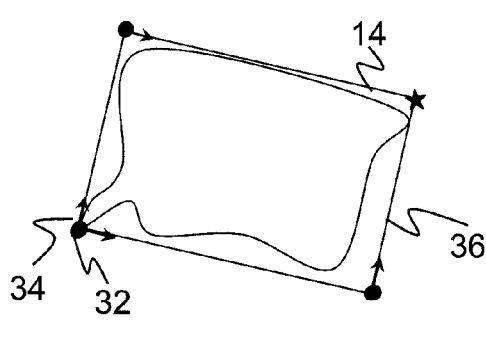
Figure 5:
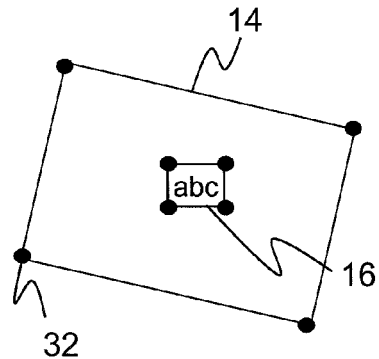

The invention will be explained in more detail in the following also with respect to further features and advantages by way of example with reference to embodiments and to the enclosed drawing. The Figures of the drawing show in:

FIG. 1 a schematic three-dimensional representation of an embodiment of the apparatus in accordance with the invention above a conveyor belt with a plurality of objects moved thereon;

FIG. 2 a schematic plan view of the contour of the surface of a parallelepiped-shaped object for the explanation of the transmitted reduced geometrical information;

FIG. 3 a schematic plan view in accordance with FIG. 2 of the contour of an object of irregular shape as well as of the associated transmitted geometrical information;

FIG. 4 a schematic plan view of the contour of an object of irregular shape with an enveloping simple body; and FIG. 5 a plan view of a packet with a region of interest which includes code information.

FIG. 1 shows in a schematic three-dimensional representation the arrangement of an embodiment of a geometry detection sensor 10 in accordance with the invention above a conveyor belt 12 on which objects 14 are moved past the sensor 10 in a direction indicated by the arrows. The objects 14 carry information 16 which is detected and read out by a line scan camera 18 arranged subsequent to the sensor 10.

The sensor 10 is a laser scanner which can determine distances of the moved past objects 16 by means of a time of flight method or which can acquire geometrical information on the objects 14 with reference to the remission behavior of the objects 14. Since the sensor 10 scans the moved past objects 14 line-by-line, it takes a three-dimensional contour of the convey belt 12 and of the objects 14 moved on it. For this purpose, the sensor 10 has an associated geometry detection control 20 which allocates the contour information to desired geometrical information on the objects 14, for example to the volume, the location, the position, the height or other conceivable geometrical properties.

Via an interface, not shown, to a data line or to a bus system 22, which can also be wireless, the geometrical data preprocessed in a manner still to be described in connection with FIGS. 2 to 5 are transmitted to an interface, likewise not shown, of a camera control 24 of the line scan camera 18. The controls 20 and 24 can alternatively also be a combined control 26; their position in space can be changed via corresponding interfaces.

Alternatively to a laser scanner, an image sensor can also be used as the geometry detection sensor 10. It can detect geometrical data by an image evaluation or can, for instance, according to the principle of photon mix detection, also be able to determine a distance with respect to each pixel of its CCD or CMOS imaging chip by means of a time of flight method. Conversely, instead of the camera 18 which likewise includes a CCD or CMOS chip, a different system can be used, for instance a barcode scanner or also a robot which grips or machines the objects. With an image sensor which is made for the determination of distance data, in a further embodiment, the geometry detection sensor 10 and the line scan camera 18 can be integrated on the basis of only one single common imaging chip, for instance a PMD-CMOS chip.

The geometrical data to be determined by the geometry detection sensor 10 can relate to objects 14, but also only to partial regions of these objects 14. Partial regions within objects 14 with respect to which geometrical data are generated can be specific structures 16 on the object 14 (region within object) or regions of interest (ROI), such as labels, code information, lettering information; however, other partial regions can also be meant, for instance a screw socket or a handle for the machining by a robot.

A pre-evaluation is therefore carried out in the geometry detection sensor 10 or in its control 20 which determines one or more spatial regions of the object 14 in which such information 16 of potential interest is contained. Alternatively or additionally, such regions of the object 14 can also be set forth in which no information of interest is present (clear area). In the latter case, the subsequent system 24, 18 at least knows which regions do not require any further evaluation or treatment.

Provision is made in accordance with the invention for the geometry detection sensor 10 to take the geometry with a high resolution, but then to reduce it by a pre-evaluation and only to output correspondingly reduced geometrical data to the data line 22 via its interface. This will now initially be explained for a parallelepiped-shaped object 14 with reference to FIG. 2 and later for an object 14 of irregular shape with reference to FIG. 3.

In FIG. 2, an inclined parallelepiped-shaped object 14 is disposed on the conveying device 12 indicated by two dashed arrows. Scan lines of the geometry detection sensor 10 are indicated by perpendicular dashed lines 28 and the object 14 located at different conveying positions is gradually scanned by it at different times. The interval of the dashed lines 28 in this respect corresponds to the resolution at which the geometry detection sensor 10 scans line-wise. In contrast to this, solid lines 30 designate conveying positions with respect to geometrical information which the control 20 of the geometry detection sensor 10 applies to the data line 22. The output rate is substantially lower with respect to the scanning rate. As long as no object is located in the field of view of the geometry detection sensor 10, geometrical data are only output occasionally. It is also possible in such situations not to transmit any geometrical data at all since they do not contain any actual information, but only serve as a sign that no defect is present. In this respect, it is also possible that the scanning rate exceeds the maximum output rate, that is the data line 22 does not provide sufficient bandwidth at all to transmit the geometrical information at the highest possible resolution.

In the region of the object 14 itself, first a corner 32a marked by a star is recognized by the control 20 and causes more geometrical information to be transferred due to the great change in the geometry of the object 14. In FIG. 2, this interval extends up to the next corner 32b and in between geometrical information is output at the highest possible rate. It is also conceivable not to output any geometrical information in the region between the corners 32a and 32b since the object again has a regular shape here. The output at a higher density in this intermediate region is therefore not caused by the irregularity in this region itself, but rather by the proximity to a corner, that is a region of high change. This proximity can accordingly also be taken up into the measure which measures the geometrical change and thus controls the information density of the output.

In the region up to the next corner 32c, the geometry is again completely regular so that no geometrical information is output. Alternatively, information could also be transmitted sporadically here to indicate the further functional capability of the geometry detection sensor 10. Geometrical information is output at maximum density up to the final corner 32d on the exit of the object 14 from the field of view of the sensor 10 similar to its entry.

The geometry detection sensor 10 or its control 20 therefore recognizes that only the entry and the exit of the corners 32 generate relevant geometrical information. The subsequent system 24 can then interpolate or extrapolate the intermediate regions itself.

The basic principle is the same with the object of irregular shape shown in FIG. 3. Here, too, the contour 28 is detected with maximum resolution, but geometrical data is only transmitted at specific times 30 at which pronounced changes in the object contour occur. The geometry detection sensor 10 recognizes such changes in each case at the points 32, and indeed by the fact that the contour line there either forms an angle which differs by a preset measure from 180° or because the accumulated angular change exceeds such a deviation over a plurality of scan lines. Other measures are conceivable and covered by the invention.

In addition to the location of the points 32 which designates the boundary of the object in the respective scan lines, the gradient of the adjacent surface is also transmitted as geometrical information. This is marked by arrows 34 in FIG. 3. The adjacent surface can be extrapolated by the subsequent system 24 with the help of the point and of the arrow, that is of a position with a gradient. The planar surface which thus arises or the straight edge describes the irregular contour line 14 or the adjacent surface sufficiently well for so long until a further point 32 is again transmitted with a new gradient 34. The irregular contour line 14 is thus described with a few positional data and gradient data.

In the plan view in accordance with FIG. 3, the object 14 is only a simple line as a border of a surface. In the three-dimensional case, a plurality of surfaces, namely a side surface and a roof surface, are adjacent to this line. The invention thus includes both descriptions of the geometry with a corner or an edge and a gradient which runs along the edges and those in which the direction of adjacent surfaces is described by respectively one or more characterizing vectors which are accordingly gradients or also only gradient vectors in specific geometrical sections, for example along an axis or a plane. The invention here includes all common relationships known to the mathematician skilled in Euclidean geometry for the local description of multiplicities and their borders by means of base vectors or gradient vectors even if they are not always correctly called gradients in strict mathematical terms within the framework of this description.

Since a specific time passes until the object 14 reaches the subsequent system 18 on the conveying device 12, no very strict real time demands have to be satisfied. The control 20 of the geometry detection sensor 10 can thus read in at least some scan lines 28 in advance. It can use this time advantage to transmit the geometrical information with a little delay and in return with a better estimate of the gradient or a better estimate of the required positions 32 to be transmitted into which the contour information 28 read in the meantime flows. It can also use the time advantage to output additional more precise geometrical information on object regions with greater change read out earlier in time windows in which the currently read out geometrical information does not change greatly and in which therefore little data has to be transmitted.

FIG. 4 explains a simplified embodiment in which an object 14 of irregular shape is approximated by a simple enveloping body 36. This body is preferably a parallelepiped, but can also be another simple geometrical shape such as a sphere, a cylinder or the like. Instead of the geometrical information on the irregular object 14 itself, only geometrical information on the enveloping body 36 is then output. This reduces the amount of data, but quasi by definition does not follow the irregularities of the object 14 and can therefore be suitable for some applications and not for others. The transmission of the geometrical information on the enveloping body 36 takes place fully analogously as described in connection with FIG. 2 or FIG. 3 for the object 14 itself.

FIG. 5 explains a situation in which objects or relevant object regions are superimposed on one another. A region of interest, namely a code label 16, on an object 14 is shown. In this case, both regions whose geometries are to be determined, namely the object 14 and the region of interest 16, are simply treated analogously to the methods described in connection with FIGS. 2 and 3. In this respect, therefore, geometrical information on the regions 32, that is regions with a great change in the object geometry, and optionally additionally gradient vectors, are transmitted.

In accordance with the invention, the object is therefore detected by a prior sensor with a higher resolution than that at which the geometrical information should then be transmitted. The prior sensor determines the object properties based on distance values and/or remission values of the objects. Irrespective of whether information is determined on the total object or only on partial regions of the object, the frequency of the generated intermediate information is dynamically adapted to the changing object properties.

As an exemplary embodiment, a volume measurement system or a laser scanner has been described as a prior sensor which transmits control information in the form of geometrical data to a camera system as a subsequent system. This control information can be used in the camera system, for example, for focusing, the setting of other taking parameters such as the taking frequency, brightness or zoom factor, or for the recognition of regions of interest.

In this respect, the information is generated and transmitted in more detail in greatly changing regions of the object than in more homogeneous and regular regions. For this purpose, the geometrical information is transmitted at a dynamically adapting interval. The control parameter for the dynamic interval is the object geometry change, i.e. if the object geometry changes greatly, the intervals become smaller; if the object geometry remains regular, the intervals become larger. The object is evaluated in all dimensions for the observation of the geometry change.

The geometry information output with respect to a section can be provided with positional indications in the conveying direction, for example an incremental spacing, so that a position on the conveying belt can be associated with them. Changing vertical relationships within the object can thus also be imaged, for example. The connected systems can calculate the object form from the transmitted geometrical data within the framework of the demanded and set precision of the geometrical model without any loss or practically without any loss.

In addition, information of the enveloping body continues to be generated. This information can alternatively or additionally be used by overriding processes, for example, for position information, occupied information or gripping information.

The bus system and the camera are thus not loaded with unnecessary data. Similar to a camera system, other systems such as robot handling systems, for instance, can also profit from the invention.

A particular strength of the invention is in situations in which an object 14 is larger than the spacing between the geometry detection system 10 and the subsequent system. The geometry detection can then still not be completed while the further machining is already taking place. The interpolation and extrapolation of the object contour is a help here.

The invention claimed is:

1. An object geometry measurement apparatus for the dynamic generation and transmission of geometrical data of objects moved on a conveying device,
wherein the apparatus has a first optoelectronic sensor which is made for the detection of the object geometry in a section of the object with reference to intervals and/or of the remission behavior, as well as a first control which can calculate geometrical data from the object geometry of each section and can output them via a first interface, characterized in that the first control is made to adapt the information density of the output geometrical data to a measure for changes of the object geometry from section to section.

2. The object geometry measurement device in accordance with claim 1, wherein the first sensor is a line scan sensor and each section is a line; and wherein the output geometrical data are the positions of edges or corners of the objects or of regions of interest, in particular code regions, within each line.

3. The object geometry measurement device in accordance with claim 1, wherein the first control is designed to output one respective gradient vector with respect to each edge or corner for the adjacent surfaces and only to output further geometrical data with respect to a corner or edge when the gradient of a surface in a section changes with respect to the output gradient vector or to that of the previous section by more than a preset gradient threshold.

4. The object geometry measurement device in accordance with claim 1, wherein the first control is made to output geometrical data for each section if the changes are larger than a preset threshold and not to output any geometrical data or only to output geometrical data for every nth section if the changes are smaller than a preset threshold.

5. The object geometry measurement device in accordance with claim 1, wherein the geometrical data have a location, a volume, a contour and/or an orientation of the objects.

6. A reading apparatus for codes of objects moved on a conveying device there being an object geometry measurement apparatus for the dynamic generation and transmission of geometrical data of objects moved on a conveying device,
wherein the apparatus has a first optoelectronic sensor which is made for the detection of the object geometry in a section of the object with reference to intervals and/or of the remission behavior, as well as a first control which can calculate geometrical data from the object geometry of each section and can output them via a first interface, wherein the first control is made to adapt the information density of the output geometrical data to a measure for changes of the object geometry from section to section, the reading apparatus having an integrated second optoelectronic sensor or a second optoelectronic sensor arranged subsequently in the conveying direction which is made for the detection of codes as well as having a second interface for the reception of the geometrical data.

7. The reading apparatus in accordance with claim 6, wherein a second control of the second sensor is provided which is designed only to take or evaluate image data within objects marked by the geometrical data or within regions of interest or to take them or evaluate them at a higher precision and accordingly not to take or evaluate image data outside objects marked by the geometrical data or outside regions of interest at all or only to take or evaluate them at a lower precision.

8. The reading apparatus in accordance with claim 6, wherein the second control is made to determine object limits or limits of regions of interest with reference to transmitted positions of edges or corners of objects or regions of interest and to interpolate and/or extrapolate these limits, in particular in a linear manner by means of a likewise transmitted gradient vector.

9. The apparatus in accordance with claim 6, wherein the first sensor is a laser scanner or an image scanner and the second scanner is a barcode scanner or an image sensor.

10. An apparatus for the automatic machining of objects moved on a conveying device having an object geometry measurement apparatus for the dynamic generation and transmission of geometrical data of objects moved on a conveying device,
wherein the apparatus has a first optoelectronic sensor which is made for the detection of the object geometry in a section of the object with reference to intervals and/or of the remission behavior, as well as a first control which can calculate geometrical data from the object geometry of each section and can output them via a first interface,
wherein the first control is made to adapt the information density of the output geometrical data to a measure for changes of the object geometry from section to section,
wherein a processing device, in particular a robot, is provided into which the first sensor is integrated or which is arranged subsequently to the first sensor in the conveying direction,
wherein the processing device has a processing control for the reception of the geometrical data which is made for the processing of the geometrical data for the planning of gripping steps and machining steps.

11. A method for the dynamic generation and transmission of geometrical data of objects moved on a conveying device,
wherein the object geometry is detected by a first optoelectronic sensor in a section of the object with reference to intervals and/or to the remission behavior,
wherein geometrical data are calculated from the object geometry of each section and are output via a first interface,
characterized in that the information density of the output geometrical data is adapted to a measure for changes of the object geometry from section to section.

12. The method in accordance with claim 11, wherein each section is a line, wherein the output geometrical data are the positions of edges or corners of the objects or of regions of interest, in particular code regions, within each line, and wherein a gradient vector is output for the adjacent surfaces with respect to each edge or corner and further geometrical data with respect to an edge or corner are only output when the gradient of a surface changes in a section with respect to the output gradient vector or that of the previous section by more than a preset gradient threshold.

13. The method in accordance with claim 11, wherein geometrical data are output for each section if the changes are larger than a preset threshold and no geometrical data are output or geometrical data are only output for every nth section if the changes are smaller than a preset threshold.

14. A method for the reading of codes of objects moved on a conveying device,
wherein a method is used for the dynamic generation and transmission of geometrical data of objects moved on a conveying device,
wherein the object geometry is detected in a section of the object with reference to intervals and/or to the remission behavior,
wherein geometrical data are calculated from the object geometry of each section and are output via a first interface and the information density of the output geometrical data is adapted to a measure for changes of the object geometry from section to section and wherein the geometrical data which are output are borders of objects or of regions of interest, and
wherein the output geometrical data are used to generate or evaluate image data only within the borders or within the borders at a higher precision in order to locate and read code information.

15. The method in accordance with claim 14, wherein the geometrical data are output as positions of edges or corners of the objects or of regions of interest together with gradients of the adjacent surfaces and the borders are interpolated and extrapolated, in particular in a linear manner, from this information.

16. The method in accordance with claim 14, wherein the geometrical data are used to plan and set taking parameters of an optoelectronic sensor, in particular the focus, zoom, brightness or taking frequency.

17. A method for the automatic machining of objects moved on a conveying device,
wherein gripping steps and machining steps of a processing device are planned at the objects, in particular those of a robot, by means of a method for the dynamic generation and transmission of geometrical data of objects moved on a conveying device,
wherein the object geometry is detected in a section of the object with reference to intervals and/or to the remission behavior,
wherein geometrical data are calculated from the object geometry of each section and are output via a first interface and the information density of the output geometrical data is adapted to a measure for changes of the object geometry from section to section by means of specific geometrical data.

* * * * *